(12) United States Patent
El Rouby et al.

(10) Patent No.: US 12,326,931 B2
(45) Date of Patent: Jun. 10, 2025

(54) MALICIOUS DATA ACCESS AS HIGHLIGHTED GRAPH VISUALIZATION

(71) Applicant: EMC IP Holding Company LLC, Hopkinton, MA (US)

(72) Inventors: Ahmad Refaat Abdel Fadeel Ahmad El Rouby, Heli (EG); Omar Abdulaal, Mohamed Nagi (EG); Nicole Reineke, Northborough, MA (US); Joel Christner, San Jose, CA (US); Farida Shafik, Maadi (EG); Shary Beshara, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 17/362,700

(22) Filed: Jun. 29, 2021

(65) Prior Publication Data

US 2022/0414210 A1 Dec. 29, 2022

(51) Int. Cl.
G06F 21/55 (2013.01)
G06T 11/20 (2006.01)

(52) U.S. Cl.
CPC .......... *G06F 21/554* (2013.01); *G06T 11/206* (2013.01); *G06F 2221/034* (2013.01)

(58) Field of Classification Search
CPC . G06F 21/554; G06F 2221/034; G06T 11/206
See application file for complete search history.

(56) References Cited

U.S. PATENT DOCUMENTS

| 9,038,168 | B2 | 5/2015 | Ben-Zvi et al. |
| 9,819,685 | B1* | 11/2017 | Scott ..................... H04L 63/104 |
| 9,967,265 | B1* | 5/2018 | Peer ..................... H04L 63/1416 |
| 10,296,520 | B1* | 5/2019 | Ganesh .................. G06F 16/11 |
| 10,541,938 | B1 | 1/2020 | Timmerman et al. |
| 10,587,596 | B1 | 3/2020 | Sahar et al. |
| 10,594,730 | B1 | 3/2020 | Summers et al. |

(Continued)

FOREIGN PATENT DOCUMENTS

| WO | 00/45286 A1 | 8/2000 |
| WO | 2005/106658 A1 | 11/2005 |

(Continued)

OTHER PUBLICATIONS

Getting Started with Bloodhound. Blog [online]. LBMC Professional Corporation. Nov. 25, 2019 [retrieved on Apr. 30, 2024]. Retrieved from the internet: <URL: https://www.lbmc.com/blog/getting-started-with-bloodhound/> (Year: 2019).*

(Continued)

*Primary Examiner* — Carl G Colin
*Assistant Examiner* — Zhe Liu
(74) *Attorney, Agent, or Firm* — Workman Nydegger

(57) ABSTRACT

One example method includes monitoring a data access pattern, registering a data access request directed to data, comparing metadata associated with the data access request to a rule, based on a result of the comparing, sending a trigger to a graph service, and using information in the trigger to generate a visual representation of the data access request, wherein the visual representation indicates an extent to which the data access request is considered to constitute a potential threat to the data.

16 Claims, 7 Drawing Sheets

(56) References Cited

U.S. PATENT DOCUMENTS

| | | |
|---|---|---|
| 11,256,887 B1 | 2/2022 | Dua et al. |
| 11,797,702 B2 | 10/2023 | Reineke et al. |
| 11,843,622 B1 | 12/2023 | Tellez et al. |
| 11,895,126 B1 | 2/2024 | Satish et al. |
| 11,902,306 B1 | 2/2024 | Satish |
| 2004/0024717 A1 | 2/2004 | Sneeringer |
| 2004/0054690 A1 | 3/2004 | Hillerbrand et al. |
| 2005/0033803 A1 | 2/2005 | Vleet et al. |
| 2006/0114493 A1 | 6/2006 | Slightam et al. |
| 2008/0022267 A1 | 1/2008 | Johnson et al. |
| 2008/0066165 A1 | 3/2008 | Rosenoer |
| 2008/0086482 A1 | 4/2008 | Weissman |
| 2008/0195664 A1 | 8/2008 | Maharajh et al. |
| 2009/0083652 A1 | 3/2009 | Krasner et al. |
| 2010/0286937 A1 | 11/2010 | Hedley et al. |
| 2011/0247074 A1* | 10/2011 | Manring ............... G06F 21/57 726/26 |
| 2011/0289549 A1 | 11/2011 | Raup |
| 2012/0011559 A1 | 1/2012 | Miettinen et al. |
| 2012/0041822 A1 | 2/2012 | Landry et al. |
| 2013/0173530 A1* | 7/2013 | Laron .................. G06F 16/176 707/608 |
| 2014/0006951 A1 | 1/2014 | Hunter |
| 2014/0019443 A1 | 1/2014 | Golshan |
| 2015/0193781 A1 | 7/2015 | Dave et al. |
| 2015/0310188 A1 | 10/2015 | Ford et al. |
| 2015/0339324 A1 | 11/2015 | Westmoreland et al. |
| 2016/0028758 A1* | 1/2016 | Ellis ................... H04L 63/1441 726/25 |
| 2016/0248809 A1 | 8/2016 | Smith et al. |
| 2016/0292445 A1 | 10/2016 | Lindemann |
| 2017/0041296 A1 | 2/2017 | Ford et al. |
| 2017/0300690 A1* | 10/2017 | Ladnai ................ G06F 21/554 |
| 2018/0027006 A1 | 1/2018 | Zimmermann et al. |
| 2018/0040154 A1 | 2/2018 | Gibb et al. |
| 2018/0184171 A1 | 6/2018 | Danker et al. |
| 2018/0248974 A1 | 8/2018 | Zhuang et al. |
| 2019/0043167 A1 | 2/2019 | Steyskal et al. |
| 2019/0080698 A1 | 3/2019 | Miller |
| 2019/0213462 A1 | 7/2019 | McDonald et al. |
| 2019/0268379 A1 | 8/2019 | Narayanaswamy et al. |
| 2019/0319808 A1 | 10/2019 | Fallah et al. |
| 2019/0327271 A1* | 10/2019 | Saxena ................... G06F 8/38 |
| 2020/0005168 A1 | 1/2020 | Bhargava et al. |
| 2020/0045049 A1* | 2/2020 | Apostolopoulos ....... G06N 7/00 |
| 2020/0145447 A1 | 5/2020 | Coffey et al. |
| 2020/0151191 A1 | 5/2020 | Agrawal et al. |
| 2020/0220892 A1* | 7/2020 | Gibson .............. H04L 63/1441 |
| 2020/0250747 A1 | 8/2020 | Padmanabhan |
| 2020/0380147 A1 | 12/2020 | Kurian |
| 2020/0412767 A1* | 12/2020 | Crabtree ............ H04L 63/1441 |
| 2021/0031106 A1 | 2/2021 | Alderman et al. |
| 2021/0056968 A1 | 2/2021 | Shreeshreemal et al. |
| 2021/0073179 A1 | 3/2021 | Berman et al. |
| 2021/0117923 A1 | 4/2021 | Gray et al. |
| 2021/0136115 A1 | 5/2021 | Andrews et al. |
| 2021/0136569 A1 | 5/2021 | Obaidi et al. |
| 2021/0144159 A1* | 5/2021 | Sanghvi ............. H04L 63/1425 |
| 2021/0173718 A1 | 6/2021 | Patel et al. |
| 2021/0273961 A1* | 9/2021 | Humphrey ............... G06N 3/08 |
| 2021/0294853 A1 | 9/2021 | Binkley et al. |
| 2021/0303714 A1 | 9/2021 | Yaghoobi et al. |
| 2021/0385252 A1* | 12/2021 | Lebin .................... G06N 20/00 |
| 2022/0012241 A1 | 1/2022 | Colcord et al. |
| 2022/0043927 A1* | 2/2022 | Sofer .................. G06F 21/6218 |
| 2022/0067097 A1* | 3/2022 | Gupta ................. G06F 21/6218 |
| 2022/0067186 A1* | 3/2022 | Thakur ................. G06F 21/604 |
| 2022/0103566 A1 | 3/2022 | Faulkner |
| 2022/0126864 A1 | 4/2022 | Moustafa et al. |
| 2022/0161829 A1 | 5/2022 | McKnew |
| 2022/0179958 A1 | 6/2022 | Robison et al. |
| 2022/0191247 A1 | 6/2022 | Dhoble et al. |
| 2022/0210172 A1* | 6/2022 | Tan ...................... G06F 21/554 |
| 2022/0237309 A1 | 7/2022 | Reineke et al. |
| 2022/0303298 A1* | 9/2022 | Lee ......................... G06F 21/55 |
| 2022/0318099 A1* | 10/2022 | Kotwal .............. G06F 11/1451 |
| 2022/0384028 A1 | 12/2022 | Dirghangi et al. |
| 2023/0004663 A1 | 1/2023 | Shafik et al. |
| 2023/0275909 A1* | 8/2023 | Shivamoggi ........ H04L 63/1441 726/23 |
| 2024/0135004 A1 | 4/2024 | Adams et al. |

FOREIGN PATENT DOCUMENTS

| | | |
|---|---|---|
| WO | 2006/073543 A2 | 7/2006 |
| WO | 2014/138984 A1 | 9/2014 |

OTHER PUBLICATIONS

ArangoDB, https://www.arangodb.com/.

Bonatti, Piero A., Ernesto Damiani, S. De Capitani di Vemercati, and Pierangela Samarati. "A component-based architecture for secure data publication." In Seventeenth Annual Computer Security Applications Conference, pp. 309-318. IEEE, 2001. (Year: 2001).

Dia, Ousmane Amadou, and Csilla Farkas. "Risk aware query replacement approach for secure databases performance management." IEEE Transactions on Dependable and Secure Computing 12, No. 2 (2014): 217-229. (Year: 2014).

Gates, Christophers., Ninghui Li, Hao Peng, Bhaskar Sarma, Yuan Qi, Rahul Potharaju, Cristina Nita-Rotaru, and Ian Molloy. "Generating summary risk scores for mobile applications." IEEE Transactions on dependable and secure computing 11, No. 3 (2014): 238-251. (Year: 2014).

Molina, Victor, Marta Kersten-Oertel, and Tristan Glatard. "A conceptual marketplace model for iot generated personal data." arXiv preprint arXiv:1907.03047 (2019). (Year: 2019).

Steve Todd et al., Privacy and Data Confidence in Edge Clouds, White Paper, Network Security, Intel, Oct. 12, 2020, 9, 12, 2020.

Tucker. "Privacy pal: improving permission safety awareness of third party applications in on line social networks." In 2015 IEEE 17th international conference on high performance computing and communications, pp. 1268-1273. IEEE, 2015. (Year: 2015).

Immonen, Anne, Pekka Paakkonen, and Eila Ovaska. "Evaluating the quality of social media data in big data architecture." Ieee Access 3 (2015): 2028-2043. (Year: 2015).

* cited by examiner

```
1.  {
2.    "result":"false",
3.    "actionType":"ENTITY_READ",
4.    "time":"Tue Jan 26 16:15:08 GMT 2021",
5.    "ip":"10.29.200.70",
6.    "user":{
7.      "name": "mary",
8.      "groups": [
9.        "developers",
10.       "engineering"
11.     ],
12.     "attributes": {
13.       "uid" : "mary",
14.       "businessUnit": "Engineering",
15.       "mail": "mrichardson@example.org",
16.       "jobTitle": "Software Developer",
17.       "objectClass": "employee",
18.       "cn": "mary",
19.       "sn": "richardson",
20.       "classification": "2",
21.       "region": "MENA"
22.     }
23.   },
24.   "entity": {
25.     "type": "resource",
26.     "classifications": [],
27.     "attributes": {
28.       "qualifiedName" : "/home/sjrothsc/workspace/Edinburgh/phase2/datasets/ieee.json_11",
29.       "data_length": 9433,
30.       "uploader_type": "person",
31.       "type": "json_array",
32.       "discovered_flags": [
33.         "pii"
34.       ],
35.       "referenceId": "ca6cd0c0-fa27-444c-9d98-0efd6bd07824",
36.       "item_unique_identifier": "11",
37.       "import_date": "2020-10-07T08:33:42.310512",
38.       "item_location": "/home/sjrothsc/workspace/Edinburgh/phase2/datasets/ieee.json_11",
39.       "keywords_list": [
40.         "csi",
41.         "and",
42.         "the"
43.       ],
44.       "name": "ieee.json 11",
45.       "uploader_details": {},
46.       "import_record_count": 2,
47.       "type_props": {
48.         "file_ext": ".json"
49.       }
50.     }
51.   }
52. }
```

FIG. 4

MALICIOUS DATA ACCESS AS HIGHLIGHTED GRAPH VISUALIZATION

FIELD OF THE INVENTION

Embodiments of the present invention generally relate to data access. More particularly, at least some embodiments of the invention relate to systems, hardware, software, computer-readable media, and methods for using metadata about a user, data request, and data asset, for example, as a basis for generating data access rules and policies that may be used to create a visual representation of user behavior with respect to certain data.

BACKGROUND

Complex data systems and repositories such as catalogs and storage systems have created a need for handling governance and regulating access to data assets. These are typically described using security policies and rules defined manually by the security administrators, mandating who is allowed access and which users/groups are denied.

Often these rules and policies may include blind spots that lead to unwanted access, by allowing permission to an entire folder, data set, file share, or even allowing access to users of an entire LDAP (Lightweight Directory Access Protocol) group. For example, in case of unwanted access by a particular user within that LDAP group to a file, systems might generate security warnings based on risk assessment. The security administrator or DevSecOps team would have to manually inspect that warning through audit logs, which may be text-based, understand the behavior of the user within the context of the access request and, finally, take an action to permit or deny the user request.

In more detail, understanding the behavior of a user, and the nature of a malicious access request, is a tedious and time consuming task, and as such may lengthen the amount of time before action is taken. For example, evaluating a potentially malicious request involves complexity and requires an understanding of the whole system. Particularly, given the complex nature of security enforcement and monitoring systems, coupled with increasing complexity found in the geometry of data, it has become increasingly difficult and impractical to manually evaluate whether a flagged interaction should be marked as malicious or not.

For example, to perform such an evaluation, security administrators would have to review logs and audit data to evaluate a malicious access request. It is cumbersome and time consuming to deal with reviewing log and audit trail data from even a single system, let alone a series of systems. This is due to the fact that this data is rarely exposed in a consistent, parse-able format, and often only available in vendor-specific text format which is laborious to parse and comprehend.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 is an example JSON format of data collated by a graph service and usable to generate a graph.

DETAILED DESCRIPTION OF SOME EXAMPLE EMBODIMENTS

Figure 1:
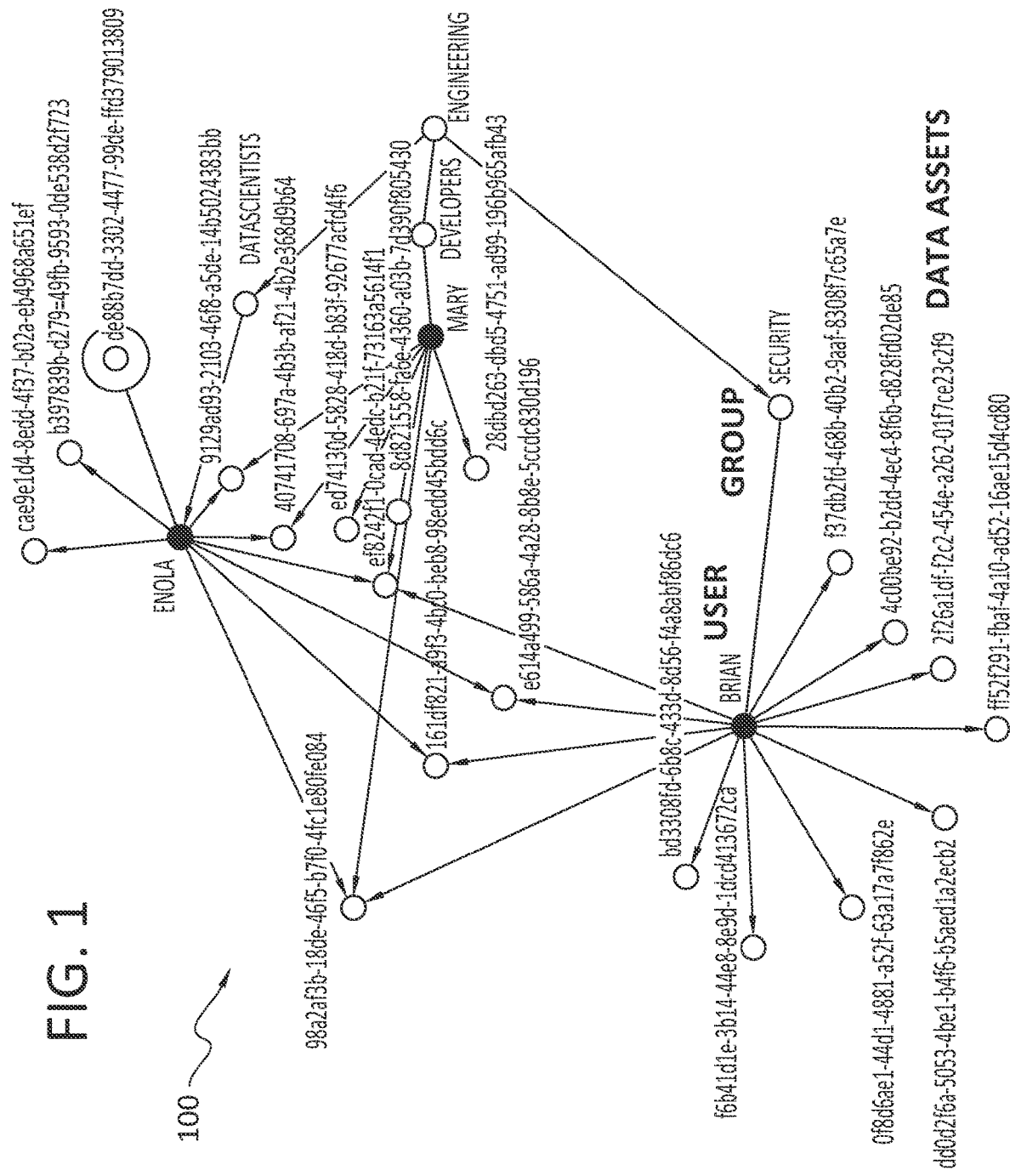
FIG. 1 discloses an example hierarchical representation of user interactions with data assets.

Embodiments of the present invention generally relate to data access. More particularly, at least some embodiments of the invention relate to systems, hardware, software, computer-readable media, and methods for using metadata about a user, data request, and data asset, for example, as a basis for generating data access rules and policies.

In general, example embodiments of the invention may implement an approach to data access that defines access rules and policies in terms of metadata about the user, request and data assets. Example embodiments may also utilize a visualization approach that represents, in graphical form, the user behavior and interactions with the system in order to highlight risky access attempts within the context of the users and the system. This approach may reduce the amount of time needed to diagnose the behavior and provide administrators with the ability to intuitively understand the patterns in the access and comprehend the nature and scope of the behavior of the malicious users. In one particular embodiment, a workflow may be implemented that may tie security audit information to graph-based visualization of user interactions to highlight risky, or at least questionable, access.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of some embodiments is that they may create and/or use metadata about a user, a user access request, and data assets, in determining whether or not a particular access request, or a pattern of requests, is indicative of malicious behavior that may present a risk to the data or the assets where the data resides. An embodiment may provide for creation and presentation of a graphical representation of user interactions and/or attempted interactions with various data assets, and the graphical representation may be configured to readily identify possible areas of risk so as to enable an administrator to take timely and effective action to reduce or eliminate the risk.

It is noted that embodiments of the invention, whether claimed or not, cannot be performed, practically or otherwise, in the mind of a human. As indicated by this disclosure, embodiments of the invention are applicable to, and find practical usage in, environments in which hundreds or thousands of users seek access on an ongoing basis to files and other data assets which may number in the hundreds, thousands, or tens of thousands. In such environments, there is a need to quickly identify possible data security threats and take effective action concerning those. The timely identification and classification of such threats in such environments is well beyond the mental capabilities of any human to perform practically, or otherwise. Accordingly, nothing herein should be construed as teaching or suggesting that any aspect of any embodiment of the invention could or would be performed, practically or otherwise, in the mind of a human.

A. Overview

In a world driven by information and data, regulating access to data assets is of the utmost importance. Organizations usually use different methods depending on the importance of their data and to whom access rights are assigned. Regulations may be translated into security policies that mandate and describe how to control access to these sensitive data assets. These security policies may be evaluated by systems of record containing sensitive data in order to enforce these policies.

An important aspect of securing data assets is having the ability to intelligently categorize and classify these assets. The process of categorization and classification may entail examining the data and generating metadata and annotations that will allow the system to predict the importance, relevance, and sensitivity of an asset relative to a requesting user. Such metadata, or data about the data, may include information such as file type, file location, file size, and file owner, and annotations may include flags that indicate the type of data found.

Historically, organizations used to define access policies based on hierarchical groups to which users belong, such as an LDAP for example, and, based on the resource exposed by the system of record that contains the data in question, such as a share or a folder on a file server. However, these approaches have proven inadequate and there is a need for alternative methods.

Thus, example embodiments may provide, among other things, methods for defining security policies based on contextual information. Such embodiments may employ information about the user, such as UserID, Group, and Location, for example, who is trying to access the asset, metadata about the asset itself, such as Sensitivity, Category, and Location, for example, as well as metadata about the access attempt, such as IP Address, Location, Time, and Date, to make a final decision of either allowing or denying access. This process may enable IT administrators and security specialists to define their policies without having to manually specify users and data assets to which those users are allowed access. Thus, enabling context such as knowing the reason for the access request and the way in which the data will be utilized, may provide information that is useful for security risk assessment, namely, corollary data.

Consider that security policies might allow for some unwanted behavior in particular cases. In a legacy model, a user could attempt to access separate files and enforcement would simply be based on inherited permissions for the file or the resource, such as a file share or bucket, as exposed by the system of record. In contrast, example embodiments may create chains of actions that include details on the data itself and its usage.

For example, consider a user who does not have permission to view files that have been tagged with both the tags "employee name" and "salary." In a conventional data access system, user access to a file with "employee name" and access to a separate file with "salary" would have gone undetected. In contrast, the metadata and annotations employed in some example embodiments may provide a level of detail on the data that enables a business to trigger an investigation when a potential security violation occurs. One example of such a violation may be when a user accesses two disparate data assets, where such access is considered problematic when those access attempts occur together or near in time or location to one another.

To continue with the foregoing example, embodiments of the invention may chain together or associate the fact that a user accessed, or attempted to, a file with the tag "employee name," with the fact that the user separately accessed, or attempted to, a file with the tag "salary." In this example, an embodiment may operate to trigger a notification to an administrator to investigate the access pattern, without necessarily denying the user access to the files.

However, just creating the notification may not always be enough. For example, in conventional approaches, DevSecOps admins are unable to easily identify if the access requests are benign or if the user behavior should be categorized as malicious. To understand the user behavior using current approaches, a DevSecOps admin would have to manually trace the user interactions with different data assets. This is a time-consuming, impractical process.

Thus, some example embodiments of the invention may reduce the time to diagnose user behavior, and act on that behavior, by collating the triggering event, relevant secondary data, and creating a graphic visualization of the user interactions with data. Particularly, such collated data may enable creation of a graphical presentation, such as a map for example, of the hierarchical user and group structure, including any metadata and annotations for each, as well as the data assets that belong to an organization, also including any metadata and annotations for each. An example graph may also include edges or other indicators that describe or denote the interactions of the users with these assets, metadata about the interactions, and the result of such interaction such as whether or not the user successfully accessed a data asset. The graph structure provided by some embodiments may enable administrators to answer questions about the user behavior such as which users that have attribute 'X' have succeeded or failed in attempts to access assets containing sensitive information.

With reference now to FIG. 1, an example of a behavioral graph 100 indicating user behavior with respect to various data assets is disclosed. In the example graph 100, some nodes indicate hierarchal groups to which users, belong to. Other nodes represent the data assets that users are trying to access, where data assets may be individually identified by a globally unique ID as shown in FIG. 1. Inputs that may be used as the basis for creation of a graph, such as the example graph 100, may include, for example, 1. identity sources (such as LDAP) such as a group or groups that a user belongs to, and 2. any system that may enable a user to query for data, interact with the data metadata, or access data itself. With regard to 1., contextual identity information may be included the graph, and in the case of 2., events related to attempts by a user to interact with metadata or data may be included in the graph.

In connection with example embodiments of the invention, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Aspects of Some Example Embodiments of the Invention

Figure 2:
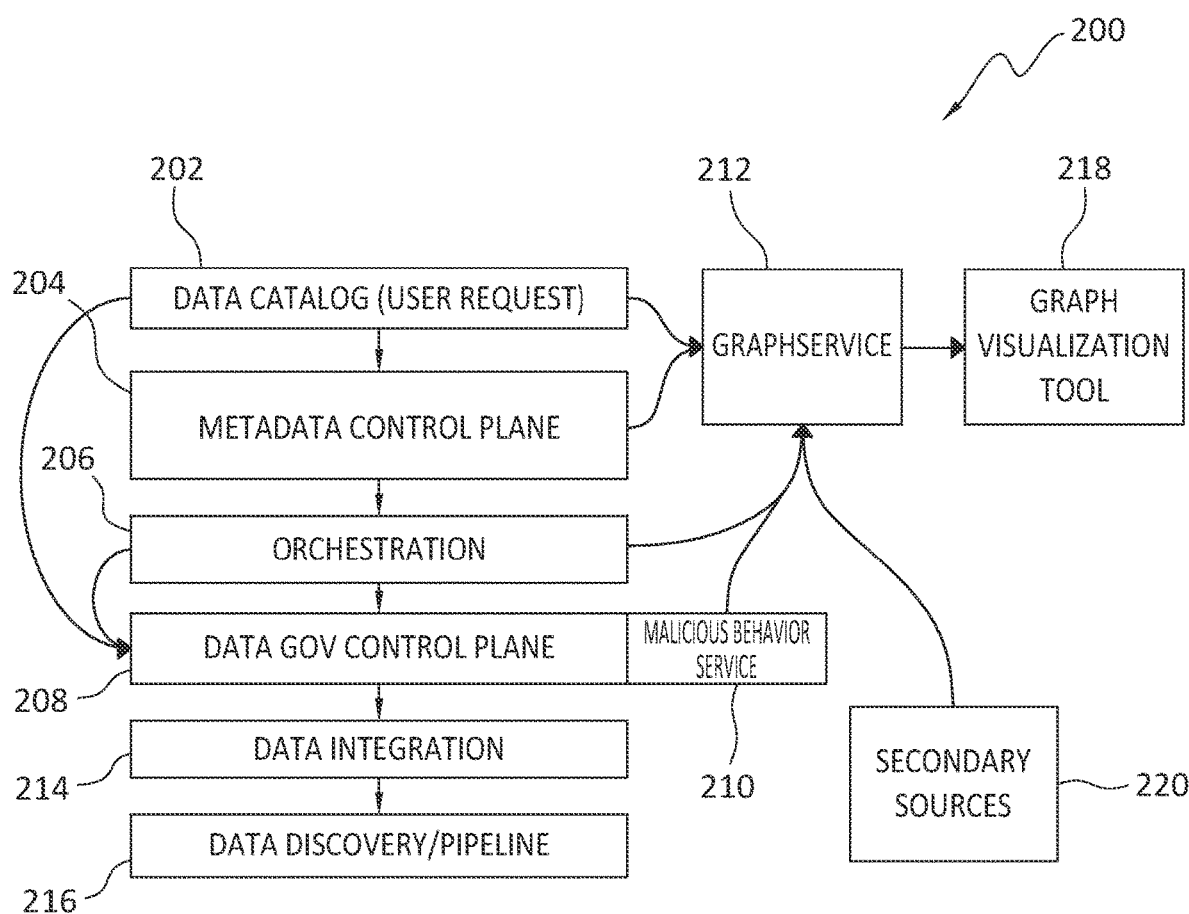
FIG. 2 discloses aspects of an example architecture in accordance with some example embodiments.

In general, some example embodiments may operate to create a new workflow that ties security-audit information to graph-based visualization of user interactions, so as to highlight risky access. With particular reference now to FIG. 2, details are provided concerning an example architecture 200. Any element of the architecture 200, such as the data discovery/pipeline for example, may communicate with a system of record (not shown) which may comprise any system containing data that could be requested by a user, such as, but not limited to, a file server, object store, or database server.

As indicated in the particular example of FIG. 2, the example architecture 200 may include various tools and services including, for example, a data catalog 202. The data catalog 202 may house and/or index all the data assets that belong to a given organization and may communicate with the system(s) of records where the actual data is stored. Further, the data catalog 202 may also contain metadata about these assets, and the metadata may be used to categorize and distinguish the assets.

The architecture 200 may also comprise a metadata control plane 204 that may comprise an interface through which metadata is exposed and managed. The structure of the metadata may be defined and managed in one or more data dictionaries.

An orchestration engine 206 may operate to orchestrate the operation of various components of the architecture 200. Such components may include, for example, the data catalog 202, data governance control plane 208, graph service 210, and malicious behavior service 212, as discussed in further detail below.

As well, the example architecture 200 may include a data integration module 214, a data discovery/pipeline 216, graph visualization tool 218, and various secondary sources 220 that may provide input usable by the graph service 212 to generate graphs and other visually perceptible renderings of potential and/or actual data risks. With continued reference to the example of FIG. 2, the data governance control plane 208 may comprise a system that relies on the context of a user request for data access to evaluate whether access should be granted based on the metadata of the asset, the properties of the user and the groups to which they belong, metadata about the access request itself, and any additional information that should be deemed necessary.

As noted earlier, the example architecture 200 may include a malicious behavior service 210 which may comprise a component tied to the data governance control plane 208 that may operate to flag certain access requests or strings of requests as malicious or risky. This malicious behavior service 210 may communicate with the graph service 212 to create or append data gathering requests. That is, the malicious behavior service 210 may provide input to the graph service 212 that the graph service 212 may use a basis to generate a graph or other representation of possibly risky behavior by a user or users. In some embodiments, the malicious behavior service 210 may employ, for example, intent of use and available access rights to calculate a risk score.

With continued reference to FIG. 2, and as noted earlier, the example architecture 200 may comprise a graph service 212. The graph service 212 may collect data and build a graph of all, or selected, user interactions and access attempts with the data catalog and systems of record. Data collected by the graph service 212 may include, but is not limited to, content from a system of record, data catalog, information from the metadata control plane such as metadata, annotations, and other rules, orchestration engine information such as audit content if needed, and information and data concerning the data governance control plane, asset data, and the access request itself. An example for a graph backend that could be used in the graph service 212 is ArangoDB (https://www.arangodb.com/), which allows for flexible JSON (JavaScript Object Notation) documents and schemas within the graph and the edges of the graph.

Figure 3:
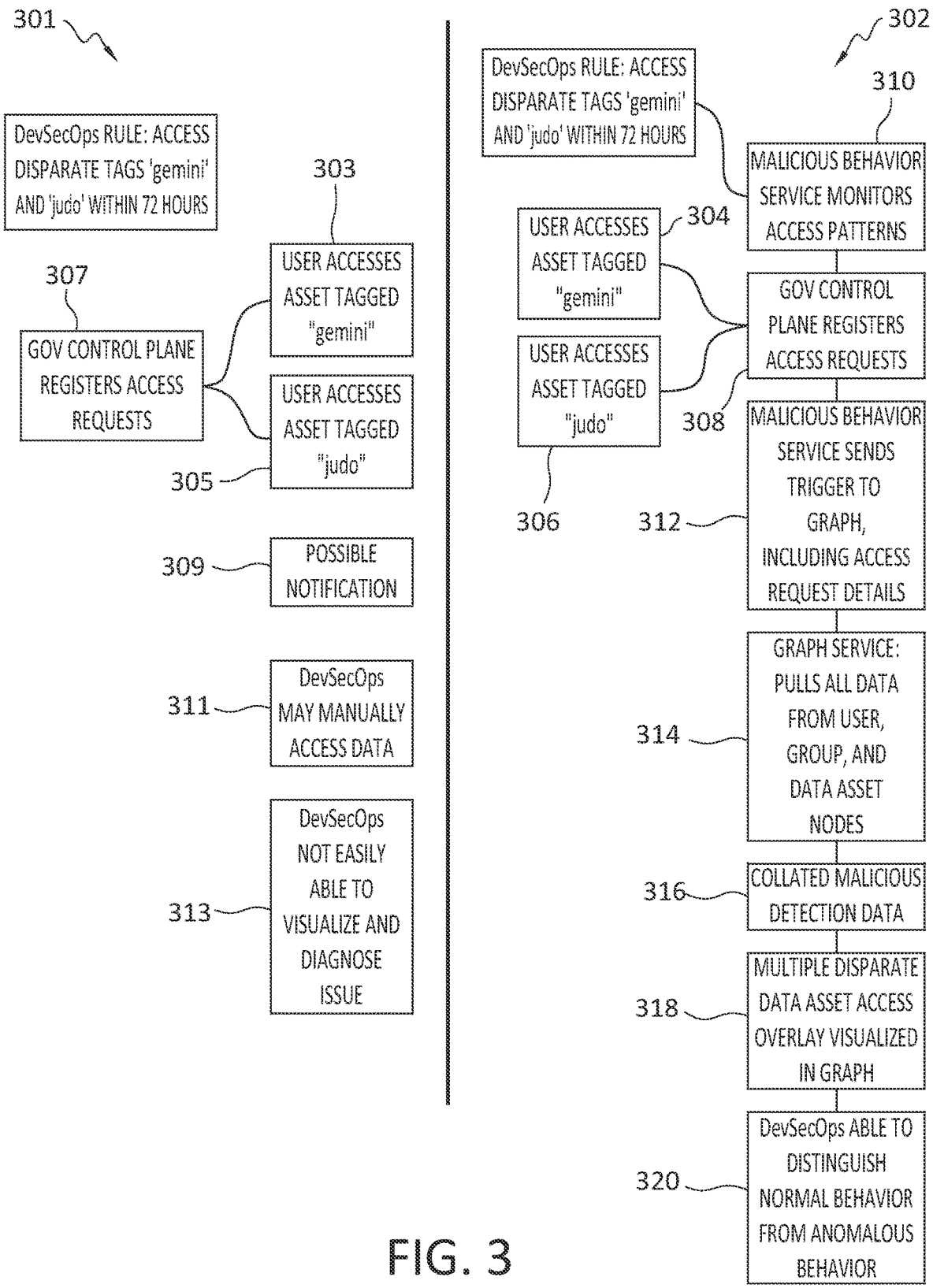
FIG. 3 discloses aspects of a comparative hypothetical workflow and a workflow according to some example embodiments.

With reference now FIG. 3, a hypothetical comparative example 301 is used to illustrate various details of an example embodiment 302 concerning the handling of a suspicious request for data access. More particularly, FIG. 3 discloses a workflow that comprises a method for detecting and collecting data for suspicious access patterns for graph-based investigation.

In the illustrative example of FIG. 3, suppose that a rule for defining a suspicious data access request is formulated as follows: "If anyone from GroupB accesses data with tag 'gemini,' then data with tag 'judo' within 72 hours, trigger Low-level malicious behavior notification." In the comparative workflow 301, a user accesses 303 an asset with the tag 'gemini' and also 305 an asset with the tag 'judo.' Both the access attempt 303 and the access attempt 305 may be registered 307 by a governance control plane. At this point, a notification 309 might or might not be sent, but the security service may not be able to easily diagnose whether or not the notification 309 actually identified a risk. Assuming that DevSecOps was able to find an issue, the investigation would be manual, involving manual access 311 of the data that was accessed, or attempted to be accessed, and would involve accessing audit logs and singular access views in an attempt by DevSecOps to comprehend the behavior to visualize and diagnose 313 the problem.

With continued reference to the example of FIG. 3, the workflow 302 may generally involve proactively triggering and collating the data, and building a graph that may enable diagnosis. Pulling together data from across all architectural components and secondary sources, as may be defined by the malicious service notification type, implementation of the workflow 302 may provide the ability to gather the right data, including data about secondary user behaviors such as querying available datasets, updating entities of a dataset, and retrieving existing metadata about a data asset. The data access requests may be gathered from a data catalog, and a graph service may collect certain information such as user information including User ID, Group, and Location, and the graph service may also collect request information, that is, information about the requests that were made, and such information may include action type (read, write, replicate, copy, delete), source IP address of the device from which the request was originated, and the time of the requests. From the governance control plane, a resulting access decision may be retrieved based on the security provider, and from the metadata control plane, metadata about the entity may be gathered. That metadata may then be collated in the graph service in a format that is readable by the graph database, which may be made available to a user based on an authorizer user login.

With specific reference now to the workflow 302, and similar to the comparative workflow 301, a user may access 304 an asset with the tag 'gemini' and also 306 an asset with the tag 'judo.' Both the access attempt 304 and the access attempt 306 may be registered 308 by a governance control plane. At 310, however, a malicious behavior service that is monitoring user access patterns may be notified by the governance control plane of the access attempts 304 and 306.

The malicious behavior service may then compare the access pattern with the rule, or rules, established to defined suspicious behavior. If the malicious behavior service determines that an access pattern or access attempt runs afoul of one or more rules, the malicious behavior service may then send 312 a trigger to the graph service. The trigger may include, for example, details concerning the access requests that were the basis for generation of the trigger.

The graph service may then pull data 314 from various sources. Those sources may include the trigger, user credentials, group information indicating which group(s) the user belongs to, and data access nodes which may have information about the user, when the user attempted access, and the data assets that were accessed or attempted to be accessed. Some or all of the data pulled 314 by the graph service may then be collated 316, and/or otherwise processed, so that it may be used for generation of a graph.

The processed 316 data may then be used 318 to create a graph that may illustrate both suspicious user behavior, and behavior that is not of a suspicious nature. The graph may visually indicate, for example, users and the data assets they have accessed or attempted to access. The graph may also indicate which group or groups a user belongs to. By visually examining the graph, DevSecOps may then be able to distinguish 320 between normal behavior and anomalous behavior. Appropriate action may then be taken based on the anomalous behavior, if any, that has been identified.

Figure 5:
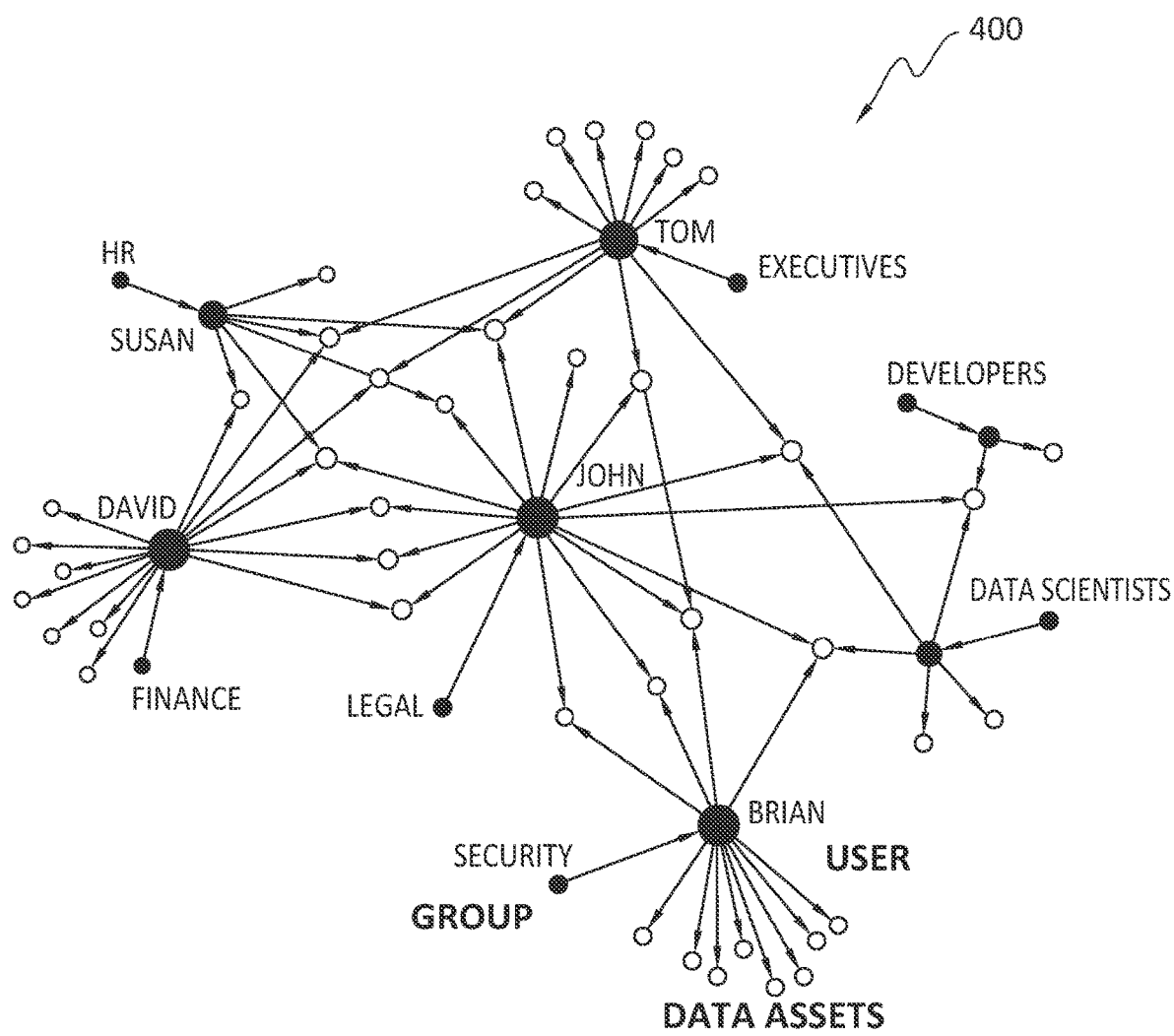
FIG. 5 is a graph according to some embodiments and indicating users, groups, and data assets accessed by the users.

With the discussion of FIG. 3 in view, attention is directed now to FIG. 4, which discloses a JSON format of example data collated by a graph service, resulting in content which could be visualized by the graph database and used to create a graph. One example of such a graph is indicated at 400 in FIG. 5. The example graph 400 contains user, group, and data asset, nodes. These nodes are connected via edges describing a certain relationship between a group and a user or an access request from a user to a given data asset. Particularly, example users, groups of users, and data assets accessed by one or more of the users, are disclosed.

Using all of the information collated by the graph service, anomalies and risky access patterns may then be identified. The malicious behavior service may proactively prompt the graph service to populate data into a graph from access requests which are flagged by the governance control plane, metadata control plane or catalog as 'risky.' This new data may be highlighted within the user behavior graph, and may also be independently filtered or queried using the API (Application Program Interface). In instances where the customer has adopted risk scoring, which refers to a numerical method of applying weighting to the severity of risk to a behavior or set of behaviors, highlighting may be varied to reflect the relative risk of the issue in the graph. Various methods for highlighting this behavior can be used. For example, edges representing malicious behavior may be colored in red to represent that such behavior requires attention, while edges representing behavior that is not problematic may be colored green. Other methods include using third-party graph visualization tools to depict the malicious behavior using a different line type/weight, or line size.

Among other things then, the workflow and visualization techniques implemented by example embodiments may provide administrators with an intuitive and fast method to identify and diagnose anomalies in the access behavior. Understanding an access attempt within the context of the overall access may ultimately reduce the time needed to take the appropriate actions.

C. Further Discussion

As disclosed herein, example embodiments of the invention may include or provide various useful features and functionalities. For example, an embodiment of the invention may implement anomalous behaviors diagnosis through the visualization of data asset access and/or access attempts whether successful or not. Particularly, some embodiments may leverage visual aids to provide IT administrators and security operators the ability to examine user interactions with data in such a way that normal behavior can be identified and distinguished from anomalous behavior. As such, some embodiments may be advantageous relative to conventional approaches which may rely on the manual parsing, by a human, of log messages where anomalous behavior may be overlooked due to human error.

As another example, an embodiment of the invention may provide and/or enable visual analysis of multiple disparate data asset access operations. For example, an action that may appear to be normal or conventional when viewed in isolation, may be considered anomalous when performed, and considered in connection, with other actions. Thus, embodiments may provide a rich context for analyzing user data access operations by considering, automatically in some embodiments, such operations not necessarily in isolation but in connection with other data access operations by the same and/or other user(s). For example, embodiments may visualize multiple disparate actions over a historical period, allowing actions to be assessed simultaneously, rather than requiring a DevSecOps admin to manually parse through multiple log files in an attempt to relate actions from the same user.

As a final example, embodiments may operate to highlight data assets that may be potential targets of malicious users. Particularly, by visually representing their anomalous behavior, relationships between the assets being accessed can be drawn, and possible justification for the unwarranted access detected. This can then be used to increase security measures around data sets of interest to malicious users.

D. Example Use Case

Figure 6:
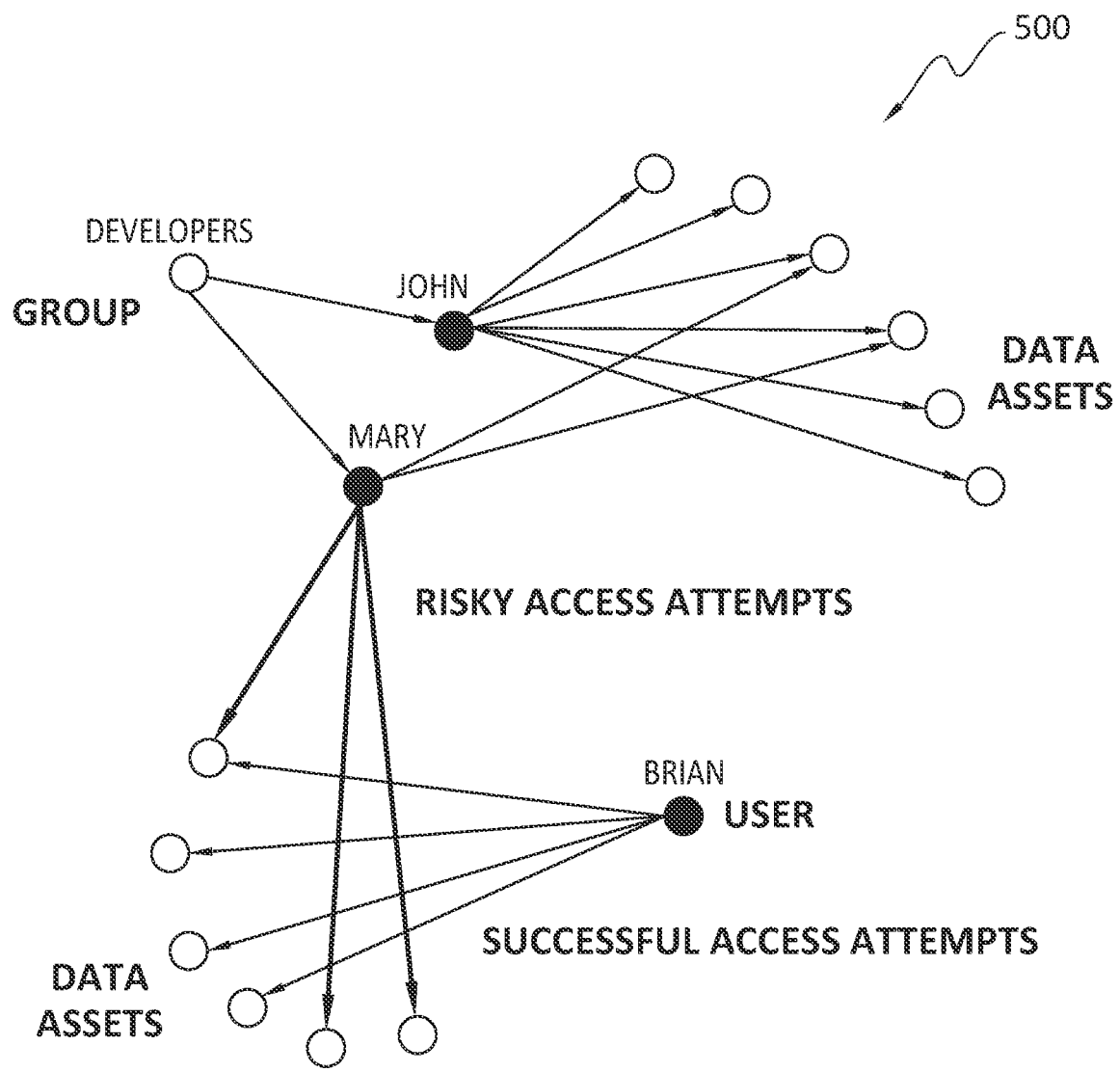
FIG. 6 is a graph according to some embodiments that draws a visible distinction between risky and non-risky behavior by users with respect to data assets.

One example use case for one or more embodiments may involve the evaluation of risky data access attempts. Particularly, upon receiving a notification for a possible risky access attempt, IT administrators may be given the opportunity to visually evaluate whether the attempt should be flagged as malicious. This may be done by using the visual tool to view a graph representing access attempts made by the user, and the graph may also highlight all risky attempts associated with the user, and possibly other users related in some way such as by the group to which they belong, to enable the admins to make an informed decision. With particular reference to the example of FIG. 6, a graph 500 is disclosed that highlights context and risky access attempt that has taken place within that context. In the graph 500, the designated edges represent successful attempts, other edges indicate risky behavior, which may be identified by comparing data and metadata concerning an attempt with the criteria of one or more rules, and still other edges indicate attempts from a flagged user.

Another example use case may concern determinations of potential malicious behavior. In this use case, an administrator may request visual information about datasets that might be potentially prone to malicious behavior by linking and associating different data assets using their metadata. This may enable IT administrators to obtain a real-time view of their data assets and visually be able to detect dangerous, or potentially dangerous, situations through a graph view.

E. Example Methods

It is noted with respect to the example method of FIG. 3, and the other processes, methods, and operations, disclosed herein that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

F. Further Example Embodiments

Following are some further example embodiments of the invention. These are presented only by way of example and are not intended to limit the scope of the invention in any way.

Embodiment 1. A method, comprising: monitoring a data access pattern; registering a data access request directed to data; comparing metadata associated with the data access request to a rule; based on a result of the comparing, sending a trigger to a graph service; and using information in the trigger to generate a visual representation of the data access request, wherein the visual representation indicates an extent to which the data access request is considered to constitute a potential threat to the data.

Embodiment 2. The method as recited in embodiment 1, wherein the monitoring and the sending are performed by a malicious behavior service.

Embodiment 3. The method as recited in any of embodiments 1-2, wherein generation of the visual representation of the data access request is performed by the graph service.

Embodiment 4. The method as recited in any of embodiments 1-3, wherein the visual representation of the data access request comprises a graph that indicates a group to which a user, that generated the data access request, belongs.

Embodiment 5. The method as recited in any of embodiments 1-4, wherein the visual representation of the data access request comprises a graph that indicates data access attempts directed to various data assets by one or more users.

Embodiment 6. The method as recited in any of embodiments 1-5, wherein the metadata comprises metadata of a user who originated the data access request.

Embodiment 7. The method as recited in any of embodiments 1-6, wherein the visual representation of the data access request is generated based in part on user metadata of a user who made the data access request, group metadata of a group to which the user belongs, and data asset metadata of the data with which the data access request is concerned.

Embodiment 8. The method as recited in any of embodiments 1-7, wherein the trigger is based on the data access request in combination with another data access request that also concerns the data, and the another data access request is made by a same user that made the data access request or is made by a different user than the user that made the data access request.

Embodiment 9. The method as recited in any of embodiments 1-8, wherein, in the visual representation, a data access request that is considered a potential threat to the data is visually distinguishable from another data access request that is not considered to be a potential threat to the data.

Embodiment 10. The method as recited in any of embodiments 1-9, further comprising taking an action regarding the data based on information presented in the visual representation.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
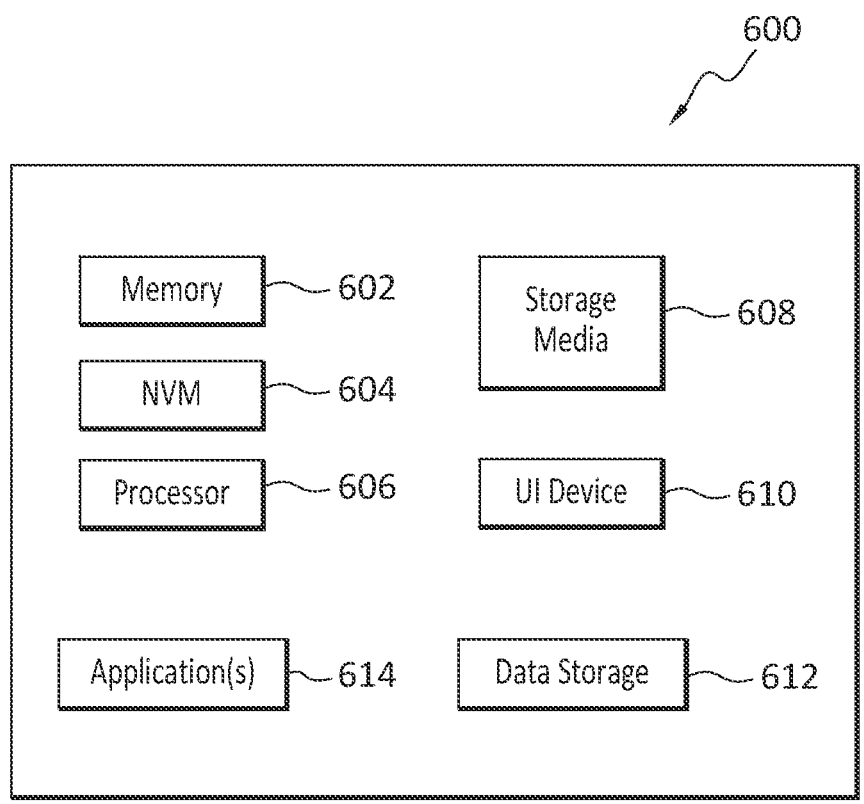
FIG. 7 discloses aspects of an example computing entity operable to perform any of the disclosed methods, processes, and operations.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 7.

In the example of FIG. 7, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
monitoring a data access pattern;
registering a data access request that comprises a data access attempt directed to data of a data asset;
generating metadata and an annotation to predict importance, relevance and sensitivity of the data asset relative to the data access request;
comparing the metadata associated with the data access request to a rule;
based on a result of the comparing, sending a trigger to a graph service, wherein the trigger is based on the data access request in combination with another data access request that also concerns the data; and
generating a visual representation of the data access request based in part on information in the trigger, user metadata, group metadata, and asset metadata,
wherein the visual representation indicates an extent to which the data access request is considered to constitute a potential threat to the data,
wherein the visual representation comprises a graph in which data assets and users are denoted by respective nodes,
wherein data access attempts by one or more of the users directed to one or more of the data assets are denoted by respective edges connecting the nodes and the one or more data assets, wherein each data asset is individually identified by a globally unique identification in the visual representation, wherein the metadata includes information comprising a file type, a file location, a file size, and a file owner of each data asset, and the annotation includes flags that indicate a type of data found, wherein edges denoting successful data access attempts are denoted by a first type of visual representation, and wherein edges denoting risky data access attempts are denoted by a second type of visual representation that is visually distinguishable from the first type of visual representation.

2. The method as recited in claim 1, wherein the monitoring and the sending are performed by a malicious behavior service.

3. The method as recited in claim 1, wherein generation of the visual representation of the data access request is performed by the graph service.

4. The method as recited in claim 1, wherein the metadata comprises metadata of a user who originated the data access request.

5. The method as recited in claim 1, wherein the user metadata is associated with a user who made the data access request, the group metadata is associated with a group to which the user belongs, and the data asset metadata is associated with the data with which the data access request is concerned.

6. The method as recited in claim 1, wherein the another data access request is made by a same user that made the data access request or is made by a different user than the user that made the data access request.

7. The method as recited in claim 1, wherein, in the visual representation, a data access request that is considered a potential threat to the data is visually distinguishable from another data access request that is not considered to be a potential threat to the data.

8. The method as recited in claim 1, further comprising taking an action regarding the data based on information presented in the visual representation.

9. A non-transitory computer readable storage medium having stored therein instructions that are executable by one or more hardware processors to perform operations comprising:

monitoring a data access pattern;

registering a data access request that comprises a data access attempt directed to data of a data asset;

generating metadata and an annotation to predict importance, relevance and sensitivity of the data asset relative to the data access request;

comparing the metadata associated with the data access request to a rule;

based on a result of the comparing, sending a trigger to a graph service, wherein the trigger is based on the data access request in combination with another data access request that also concerns the data; and generating a visual representation of the data access request based in part on information in the trigger, user metadata, group metadata, and asset metadata, wherein the visual representation indicates an extent to which the data access request is considered to constitute a potential threat to the data, wherein the visual representation comprises a graph in which data assets and users are denoted by respective nodes, wherein data access attempts by one or more of the users directed to one or more of the data assets are denoted by respective edges connecting the nodes and the one or more data assets, wherein each data asset is individually identified by a globally unique identification in the visual representation, wherein the metadata includes information comprising a file type, a file location, a file size, and a file owner of each data asset, and the annotation includes flags that indicate a type of data found, wherein edges denoting successful data access attempts are denoted by a first type of visual representation, and wherein edges denoting risky data access attempts are denoted by a second type of visual representation that is visually distinguishable from the first type of visual representation.

10. The non-transitory computer readable storage medium as recited in claim 9, wherein the monitoring and the sending are performed by a malicious behavior service.

11. The non-transitory computer readable storage medium as recited in claim 9, wherein generation of the visual representation of the data access request is performed by the graph service.

12. The non-transitory computer readable storage medium as recited in claim 9, wherein the metadata comprises metadata of a user who originated the data access request.

13. The non-transitory computer readable storage medium as recited in claim 9, wherein the user metadata is associated with a user who made the data access request, the group metadata is associated with a group to which the user belongs, and the data asset metadata is associated with the data with which the data access request is concerned.

14. The non-transitory computer readable storage medium as recited in claim 9, wherein the another data access request is made by a same user that made the data access request or is made by a different user than the user that made the data access request.

15. The non-transitory computer readable storage medium as recited in claim 9, wherein, in the visual representation, a data access request that is considered a potential threat to the data is visually distinguishable from another data access request that is not considered to be a potential threat to the data.

16. The non-transitory computer readable storage medium as recited in claim 9, further comprising taking an action regarding the data based on information presented in the visual representation.

* * * * *